(12) United States Patent
Tang (10) Patent No.: US 7,595,933 B2
(45) Date of Patent: Sep. 29, 2009

(54) HEAD MOUNTED DISPLAY SYSTEM

(75) Inventor: John Tang, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 89 days.

(21) Appl. No.: 11/595,290

(22) Filed: Nov. 9, 2006

(65) Prior Publication Data

US 2008/0088937 A1 Apr. 17, 2008

Related U.S. Application Data

(60) Provisional application No. 60/851,377, filed on Oct. 13, 2006.

(51) Int. Cl.
*G02B 27/14* (2006.01)
*G09G 5/00* (2006.01)

(52) U.S. Cl. .......................................... 359/630; 345/8

(58) Field of Classification Search ......... 359/630–634; 345/7–9
See application file for complete search history.

(56) References Cited

U.S. PATENT DOCUMENTS

| | | | |
|---|---|---|---|
| 5,469,185 A * | 11/1995 | Lebby et al. | 345/8 |
| 5,612,708 A * | 3/1997 | Ansley et al. | 359/630 |
| 6,937,221 B2 * | 8/2005 | Lippert et al. | 345/7 |
| 2005/0286135 A1 * | 12/2005 | Weissman et al. | 359/630 |

OTHER PUBLICATIONS

U.S. Appl. No. 11/212,514 titled Lanyard for Handheld Electronic Device, filed Aug. 24, 2005.
U.S. Appl. No. 11/580,580 titled Enhanced Image Display in Head-Mounted Displays, filed Oct. 13, 2006.
U.S. Appl. No. 11/580,774 titled Peripheral Treatment for Head-Mounted Displays, filed Oct. 13, 2006.
A. Travis et al., "Flat Panel Display Using Projection Within A Wedge-Shaped Waveguide", The 20th International Display Research Conference, Sep. 2000, pp. 292-295.
Powerpoint Presentation, "Cam FPD: Cambridge Flat Projection Displays Ltd." dated Apr. 25, 2006.

* cited by examiner

*Primary Examiner*—Alicia M Harrington
(74) *Attorney, Agent, or Firm*—Beyer Law Group LLP (57) ABSTRACT

A head mounted display system is disclosed. The head mounted display system includes a remote laser light engine that generates laser light associated with a display signal. The head mounted display system additionally includes a head mounted display apparatus that is separated from the laser light engine and comprising a display unit that displays laser images. The head mounted display system further includes an imaging device coupled between the remote laser light engine and the head mounted display apparatus. The imaging device creates laser images from the laser light transmitted through an optical cable in accordance with the display signal. The laser images are delivered to the display unit in order to create display images that can be viewed by a user of the head mounted display apparatus.

28 Claims, 7 Drawing Sheets

HEAD MOUNTED DISPLAY SYSTEM

CROSS REFERENCE TO RELATED APPLICATIONS

This application claims priority to Provisional Patent Application No. 60/851,377 entitled "BINOCULAR NEAR EYE DISPLAY SYSTEM" filed Oct. 13, 2006, which is herein incorporated by reference.

BACKGROUND OF THE INVENTION

1. Field of the Invention

The present invention relates generally to head-mounted display systems. More particularly, the present invention relates to improved arrangements for processing and displaying images in a head-mounted display system.

2. Description of the Related Art

A head-mounted display (HMD) is a display device that a person wears on the head in order to have video information directly displayed in front of the eyes. HMDs are also known as near-to-eye displays. A HMD has either one or two small CRT, LCD or OLED displays with magnifying lenses and other associated optical elements. The display(s) and optics are typically embedded in a helmet, glasses, or a visor, which a user can wear.

HMDs may be configured as binocular HMDs for dual eye use. HMDs may also be configured as monocular HMDs for single eye use. The arrangement generally depends on the desired needs of the user.

Lenses and other optical components may be used to give the user the perception that the images are coming from a greater distance, to prevent eyestrain. In HMDs that use a single display, the image is typically projected through optics that split the image into two identical images, and redirects each image to the respective eye. With two displays, the HMD can show stereoscopic images. The stereoscopic images attempt to create depth to the images by simulating the angular difference between the images viewed by each eye when looking at an object, due to the different positions of the eyes. This angular difference is one of the key parameters the human brain uses in processing images to create depth perception or distance in human vision.

Some HMDs can be used to view a see-through image imposed upon a real world view, thereby creating what is typically referred to as an augmented reality. This is accomplished by reflecting the video images through partially reflective mirrors, such that the real world is seen through the mirrors' reflective surfaces. The augmented reality can be combined with the stereoscopic images in various types of applications. Some examples include applications in surgery, where radiographic data, such as CAT scans or MRI imaging can be combined with the surgeon's vision. Military, police and firefighters use HMDs to display relevant tactical information, such as maps or thermal imaging data. Engineers and scientists use HMDs to provide stereoscopic views of CAD schematics, simulations or remote sensing applications. Consumer devices are also available for use in gaming and entertainment applications.

Figure 1A:
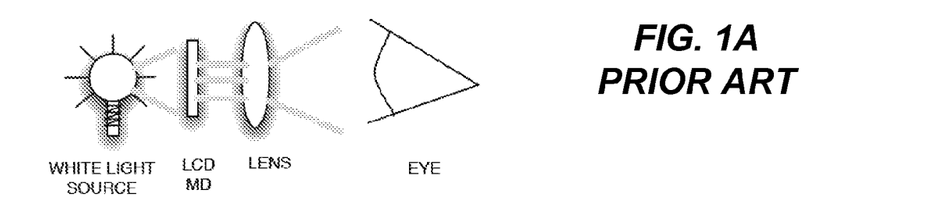
FIGS. 1A-1D schematically show some exemplary display configurations in HMDs.

FIGS. 1A-1D show some exemplary schematic views of different HMD display architectures. FIG. 1A shows an example of a transmissive HMD display architecture. In this architecture, a white light source, such as a white LED illuminates a liquid crystal display (LCD) that displays an image to a user. The image is then relayed to the user's eyes through an optical system, which can be either an aspherical or diffractive lens system. Such lens systems are well known to those of ordinary skill in the art and will also be discussed in further detail below.

Figure 1B:
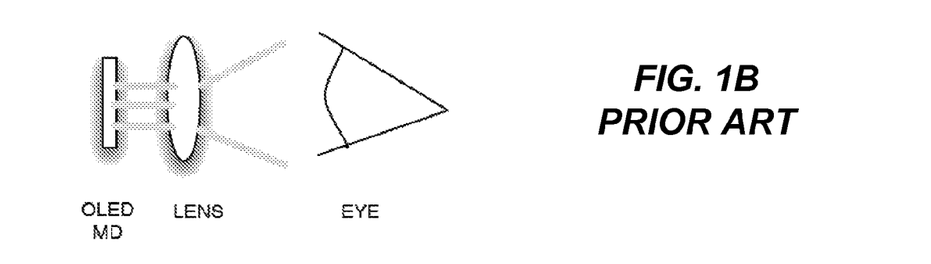

FIG. 1B shows an example of an emissive HMD display architecture. In this architecture, the display is an Organic Light Emitting Diode (OLED) display, and thus a separate light source can be avoided. The image is then relayed to the user's eyes through an optical system, similar to the system described above with respect to FIG. 1A.

Figure 1C:
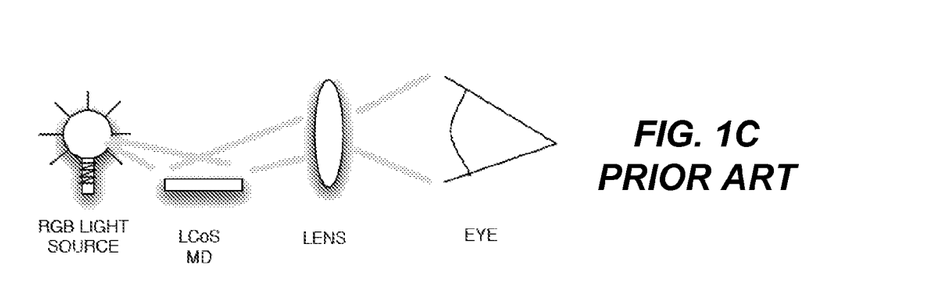

FIG. 1C shows an example of a reflective HMD display architecture. In this architecture, the display is a Liquid Crystal on Silicon (LCoS) display. In LCoS, liquid crystals are applied to a reflective mirror substrate. A light source, such as a white or RGB LED directs light onto the LCoS display. As the liquid crystals in the display open and close, the light is either reflected from the mirror below, or blocked. This modulates the light and creates the image. The image is then relayed to the user's eyes through an optical system, similar to the system described above with respect to FIG. 1A.

Figure 1D:
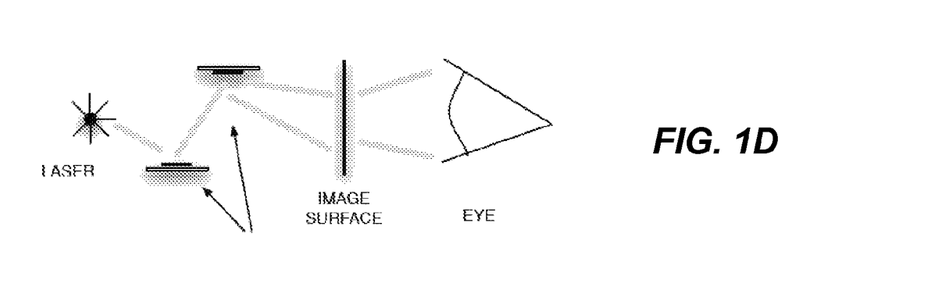

FIG. 1D shows an example of a Micro-electro-mechanical (MEM)/Laser display architecture for a HMD. MEM devices are devices that are capable of constructively and destructively interfering with an incident light source to produce one or more optical signals. Optical MEM devices are typically fabricated from Silicon-based materials using lithographic techniques. Optical MEM devices have reflective ribbons that are formed over a suitable substrate structure, such that the ribbons are spatially arranged in parallel and are coupled to the substrate structure. In use, portions of the reflective ribbons are moved by applying an operating bias voltage, or switching voltage, across the ribbons and the substrate structure. By alternating, or switching, the potential of the bias voltage, the ribbons are alternated between the positions for constructive and destructive interference with the incident light source to generate optical signals. As can be seen in FIG. 1D, the light source is a laser, and the resulting optical signals from the MEM devices are displayed on an image surface and viewed by the user.

In most HMDs the displays and optics are typically embedded in the helmet, glasses, or a visor, which is worn by the user. Unfortunately, this arrangement has several drawbacks. For one, the displays and optics take up a lot of space. Thus, the HMD may be quite large and therefore unwieldy to use. The weight of these components may further exacerbate this problem. For another, the displays may generate a lot of heat and have large power needs, which again make the HMD difficult to construct and use. Lasers are an example of devices that can generate a lot of heat and require a large amount of power to operate. Furthermore, some of these technologies have safety concerns. For example, lasers typically need to be housed in special enclosures in order to prevent laser leakage. As should be appreciated, designing around these constraints and limitations add complexity and cost to the HMD. Moreover, they can make the HMD aesthetically unpleasing, which reduces sales of the HMD.

SUMMARY OF THE INVENTION

The invention relates, in one embodiment, to a head mounted display system. The head mounted display includes a remote laser light engine that generates laser light associated with a display signal. The head mounted display also includes a head mounted display apparatus that is separated from the laser light engine and comprising a display unit that displays laser images. The head mounted display further includes an imaging device coupled between the remote laser light engine and the head mounted display apparatus. The imaging device creates laser images from the laser light transmitted through an optical cable in accordance with the display signal. The laser images are delivered to the display unit in order to create display images that can be viewed by a user of the head mounted display apparatus.

The invention relates, in another embodiment, to a head mounted display apparatus. The head mounted display apparatus includes a frame wearable on a user's head. The frame includes a viewing area. The head mounted display apparatus also includes one or more imaging devices that are physically decoupled from and in optical communication with a light arrangement. The imaging devices are carried by the frame and configured to create images from light received from the light arrangement in conjunction with a display signal. The head mounted display apparatus further includes a left optical element carried by the frame and positioned at the left of the viewing area. The left optical element is configured to receive images from at least one of the imaging devices and display them on a left imaging surface thereby creating left display images. The head mounted display apparatus additionally includes a right optical element carried by the frame and positioned at the right of the viewing area. The right optical element is configured to receive images from at least one of the imaging devices and display them on a right imaging surface thereby creating right display images. The left and right display images are viewable by a user when the frame is worn on the user's head, and the viewing area is positioned in front of the user's eyes.

The invention relates, in another embodiment, to a method of producing displayable images for a binocular near eye display system. The method includes generating RGB laser light in accordance with a display signal at a first location. The method also includes creating laser images with the laser light at a second location that is separated from the first location. The method further includes displaying the laser images at a head mounted display apparatus.

BRIEF DESCRIPTION OF THE DRAWINGS

The invention may best be understood by reference to the following description taken in conjunction with the accompanying drawings in which.

DETAILED DESCRIPTION OF THE INVENTION

The invention generally pertains to head-mounted display systems. More particularly, the invention is directed at improvements to head-mounted display systems, particularly improvements that enable the head mounted display system to be more compact, provide better picture quality, and the like. One aspect of the invention relates to processing and displaying laser based video images. Another aspect of the invention relates to separating a laser engine from an image generator so that the laser engine can be physically decoupled from a head mounted display apparatus. This may for example be accomplished with a fiber optic cable. By separating the laser engine, a more lightweight compact smaller head mounted display apparatus can be created. Furthermore, concerns over heat, power requirement and safety at the head mounted display apparatus are greatly diminished. Another aspect of the invention relates to utilizing wedge optics to display the video images. Wedge optics are very thin and therefore a low profile head mounted display apparatus can be created. Wedge optics also provide a very large picture.

Embodiments of the invention are discussed below with reference to FIGS. 2-9. However, those skilled in the art will readily appreciate that the detailed description given herein with respect to these figures is for explanatory purposes as the invention extends beyond these limited embodiments.

Figure 2:
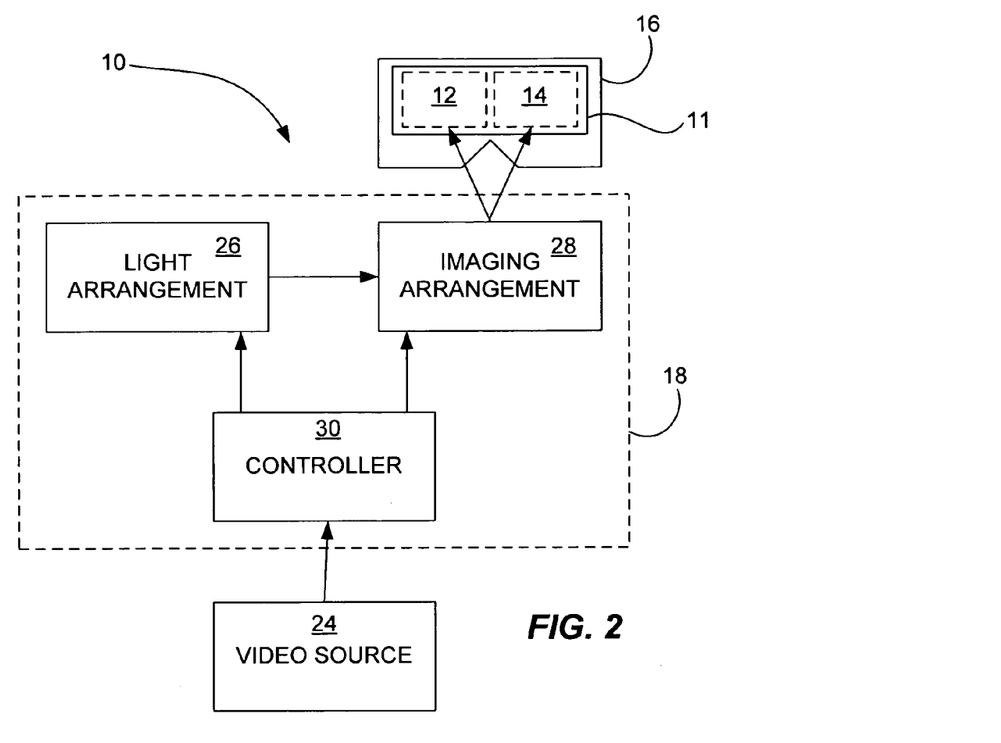
FIG. 2 is a block diagram of a binocular near eye display system, in accordance with one embodiment of the present invention.

FIG. 2 is a simplified diagram of a binocular near eye display system 10, in accordance with one embodiment of the present invention. The binocular near eye display system 10 is configured with a display unit 11 that displays video information directly in front of a viewers eyes. The display unit 11 is typically mounted on wearable head gear 16 that places the display unit 11 in its correct position relative to a viewer's eyes. The wearable head gear 16 may for example be embodied as a pair of glasses, goggles, helmets and/or the like. This arrangement is sometimes referred to as head mounted display glasses (or HMD glasses).

In most cases, the display unit 11, which may be formed from one or more display elements, is configured display multiple images, one for each eye of the user. For example, the display unit 11 may display a first image 12 in front of the viewer's left eye and a second image 14 in front of the viewer's right eye when the head gear 16 is worn on the user's head. In the case of a single display element, each of the dual images 12 and 14 may be displayed at different portions of the display element (e.g., left and right portions). In the case of multiple display elements, each of the dual images 12 and 14 may be displayed at a corresponding display element (e.g., left and right display elements). In either case, the display elements may be embodied as flat panel displays such as miniaturized display screens which receive projected video images thereon and/or optical display elements which optically transmit the video images through an optical image surface.

The binocular near eye display system 10 also includes a video generator unit 18 that produces video images from an incoming display signal, and transmits the video images to the display unit 11 so that dual video images can be viewed. The dual video images may for example may be projected onto and/or injected into the display elements of the display unit 11.

The video generator 18 may utilize various techniques to create the dual video images. In one embodiment, the dual images are contained in a single image field. That is, the dual video images may be part of a single created video image that is divided into first and second video image portions (the images are drawn together). In another embodiment, each of the dual images is a separately distinct image field. That is, the dual images are two distinct video images, rather than one video image that is split into two portions (the images are drawn separately). Additionally or alternatively, the dual video images may be identical parallel images or they may be non parallel images (e.g., stereoscopic). In all of these cases, the video images are generated in accordance with the incoming video signal.

The incoming video signal may for example be a component, composite, HDMI video signal that is produced by a video source 24 such as a DVD player, video storage device, media player, TV receiver, cable receiver, satellite receiver, computer, and the like. In most cases, the video source 24 is a stand alone unit that communicates with the video generator unit 18 via a wired or wireless connection. Alternatively, the video source 24 may be integrated with the video generator unit 18 thereby forming a single integrated device (e.g., hard wired).

Generally speaking, the video generator unit 18 includes a light arrangement 26 capable of generating RGB light, and an imaging arrangement 28 capable of manipulating the RGB light to produce the dual video images in accordance with the incoming video signal. That is, the light arrangement 26 and imaging arrangement 28 are synched together to form dual video images 12 and 14 that can be projected onto or injected into the display element(s) of the display unit 11. In one embodiment, the imaging arrangement 28 includes a single imaging device for creating the dual video images. In another embodiment, each of the dual video images is created by a separate imaging device of the imaging arrangement 28.

One or more controllers 30 may also be provided to convert or transform the incoming video signal into parallel synchronized control signals that can be read by the light arrangement 26 and imaging device(s) 28 in order to produce the dual video images. For example, the controller 30 may include a processor connected to memory, which contains instructions for how to convert image frames contained in the video signal into control signals capable of creating dual video images.

The light arrangement 26 may be widely varied. For example, the light arrangement 26 may include a white light source and a color wheel that filters the white light into red, green and blue light. A clear section may also be used to improve brightness and decrease color saturation. The light arrangement 26 may also include dedicated color light sources such as a red light source, green light source and blue light source. In one embodiment, the light sources are lasers. Lasers offer many advantages over other types of light sources (e.g., infinite focus, the wide color gamut, small size, etc.).

The imaging arrangement 28 may also be widely varied. For example, the imaging device(s) of the imaging arrangement may be a reflective based imaging device(s) that reflect the RGB light in a controlled manner in order to produce the dual video images. Alternatively, the imaging device(s) may be transmissive. Furthermore, the imaging device(s) may be mechanical or non mechanical in nature. Moreover, the imaging device(s) may create whole scan images (drawing all dots at once) or raster scan images (drawing one dot at a time) depending on the needs of the systems. In some cases, the image device includes one image element per color and these colors are combined optically to produce a video image. In other cases, the image device includes a single image element that processes red, green and blue components in succession.

In one embodiment, the imaging element(s) are associated with MEMS (Micro Electro Mechanical Systems). MEMS integrate mechanical elements and actuators with electronic elements. MEMS based elements may for example be embodied as one or more tiltable micro mirrors (or possibly deformable mirrors) that can reflect light in order to create the video images. In some cases, the micro mirror(s) are configured to generate raster scanned images. For example, a horizontal and vertical mirror may cooperate to draw an image pixel by pixel. In other cases, the micro mirrors are configured to generate whole scanned images. For example, the mirrors are set up in a matrix with each mirror reflecting some of the light to form a pixel of the video image. Digital light processing (DLP) is one technique that utilizes a matrix of mirrors.

In another embodiment, the imaging element(s) are associated with LCOS (liquid crystal on silicon). LCOS is a reflective technology that uses liquid crystals instead of individual mirrors to create whole scan images. As the liquid crystals open and close, the light is either reflected from the mirror below or blocked.

As should be appreciated, MEMS and LCOS based imaging elements are typically embodied as a semiconductor chips and therefore they add little to the weight of the head gear 16.

In yet another embodiment, the imaging element(s) are associated with a transmissive liquid crystal technology rather than a reflective liquid crystal technology. In this embodiment, rather than using liquid crystals to reflect light, the liquid crystals are used to transmit and block light (e.g., they open and close to either transmit or block light).

In accordance with one embodiment of the present invention, the display element(s) of the display unit 11 are embodied as optical element(s) capable of transmitting and displaying video images though an optical imaging surface. The optical elements receive the images from the imaging device (projected onto, or injected into), and optically transmit, convert and/or reformulate them for viewing at imaging surfaces. The optical element(s) may be formed from a wide variety of optical components. In one implementation, the optical element(s) include an optical entry point, an expansion portion and a display portion. The optical entry point receives video images from the imaging device 28. The expansion portion allows the images to be expanded from a small image to a larger image. This may for example be accomplished with total internal reflection. The display portion allows the images to be viewed at an imaging surface that is perpendicular to the eye. The display portion may for example include a tapered or stepped surface on the opposite side of the imaging surface that changes the angle of incidence of the image progressively to create the display image(s) at the imaging surface (the image emerges from the tapered portion when the angle of incidence reaches a certain point).

In some cases, the expansion portion and display portions may be layered or stacked in a parallel relationship in front of the eye in order to reduce the overall size of the optical element. In cases such as these, additional optical components may be needed between the expansion portions and display portions in order to adjust the direction of the light being transmitted therethrough (e.g., bend the images). Additionally or alternatively, the expansion portion and display portions may be formed from substantially transparent materials such that the user can see normally when images are not being displayed.

In accordance with another embodiment of the present invention, the light arrangement 26 is decoupled from the imaging arrangement 28 so that the light arrangement can be placed remotely away from the wearable head gear 16. In this embodiment, the light generated by the light arrangement 26 is delivered to the imaging arrangement 28 located at the wearable head gear 16 via an optical cable such as a fiber optic cable. By way of example, the imaging arrangement 28 may be mounted on the head gear 16. By keeping the light arrangement 26 remote from the head gear 16 several advantages can be realized. This is especially true for laser based light sources. For one, the size and weight of the head gear is substantially reduced. For another, safety concerns are diminished. For example, there is substantially no need to worry about heat production and preventing light leakage which typically adds complexity and cost to the head gear. In addition, there are minimal power needs at the wearable head gear (the light sources typically require large amounts of power, but the imaging device typically does not).

The controller 30 may be located remotely with the light arrangement 26 or locally with the imaging arrangement 28 depending on the needs of the system 10. In most cases, however, the controller 30 is located remotely with the light arrangement 26.

The location of the imaging device(s) of the imaging arrangement 28 may be widely varied. For example, the imaging device(s) may be disposed behind the display unit, and/or around the edges of the display unit (e.g., bottom edge, top edge, left edge, right edge) depending on the needs of the system. The imaging devices are typically located at locations that place them proximate the display elements of the display unit, and if optical elements proximate the optical entry point of the optical element. In some cases, light pipes or guides or other optical components may be used to route the video images from the imaging device to their desired location relative to the display elements of the display unit (Although this typically adds complexity to the system).

Figure 3:
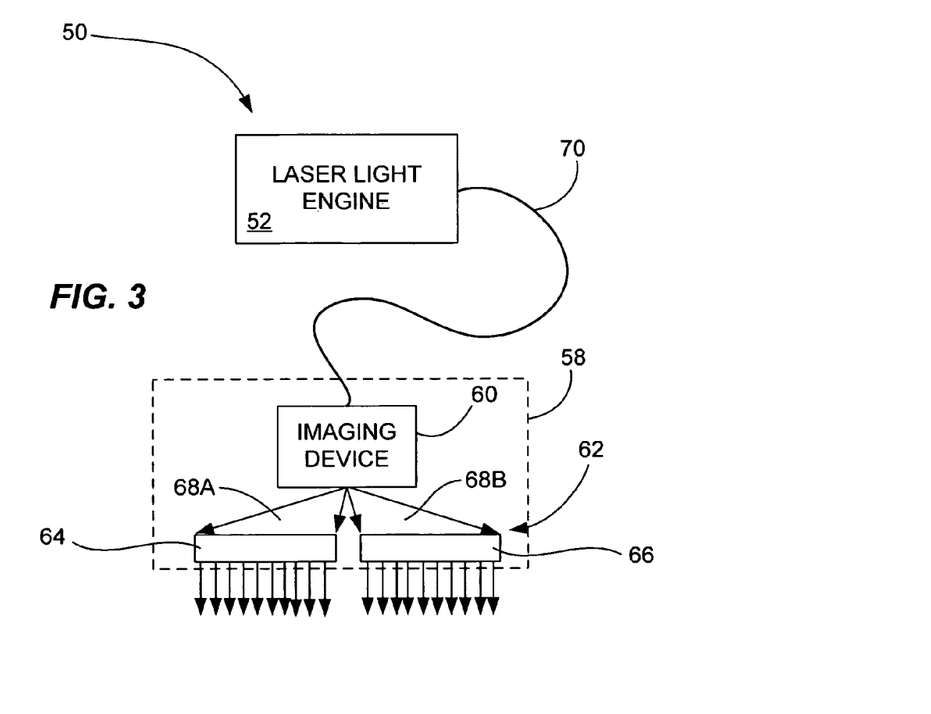
FIG. 3 is a block diagram of a laser based binocular near eye display system, in accordance with one embodiment of the present invention.

FIG. 3 is a block diagram of a laser based binocular near eye display system 50, in accordance with one embodiment of the present invention. The laser based binocular near eye display system may for example correspond to the binocular near eye display system shown and described in FIG. 2.

As shown, the laser based binocular near eye display system 50 includes a laser light engine 52 configured to generate RGB laser light in accordance with a display signal. By way of example, the laser light engine 52 may include one or more laser light sources capable of generating RGB laser light. In one example, the laser light engine includes at least a red laser source, a green laser source and a blue laser source. A white laser source may also be utilized.

The laser based binocular near eye display system 50 also includes a head mounted display apparatus 58 that is physically decoupled from the laser light engine 52. That is, they are not integrated but rather separate elements of the display system 50. The laser light engine 52 is not carried by the head mounted display apparatus 58.

The head mounted display apparatus 58 does however carry one or more imaging device(s) 60 and a display unit 62. The imaging device(s) 60 are configured to transform the RGB laser light into dual video images which can be viewed via the display unit 62. Although not a requirement, in the illustrated embodiment, a single imaging device 60 is configured to create two separate video images that are delivered to spatially separated side by side display elements 64 and 66 of the display unit 62. That is, the imaging device 60 is configured to create a left video image 68A that is delivered to a left display element 64 and a right video image 68B that is delivered to a right display element 66. Each display element 64 and 66 displays the video image at an imaging surface.

The laser based binocular near eye display system 50 also includes a cable 70 disposed between the laser light engine 52 and the imaging device 60. The cable 70 includes at least an optical line such as a fiber optic line for transmitting the RGB laser light generated at the laser engine 52 to the imaging device 60. In some cases, a single optical line is used. In cases such as this, the light is time multiplexed through the single optical line (red, green and blue light is delivered alternately through the optical line). In other cases, multiple optical lines are used. For example, each color may include its own optical line.

The cable 70 may also include an electrical control line that supplies control signals to the imaging device 60 as for example control signals generated by a controller that processes the video signals. Alternatively, the optical line disposed between the light arrangement and imaging device may be used to both transmit the RGB light from the laser engine to the imaging device as well as to transmit control signals for controlling the imaging device (e.g., multifunctionality).

The cable 70 may additionally include an electrical power line that supplies power to the imaging device 60 as for example from a power supply. The controller and power supply may be separate components or they be integrated with the laser engine 52. Alternatively, a battery may be provided at the head gear 58 to power the local imaging device(s) 60. These devices typically do not require much power and therefore a small light weight battery may be used. A battery may also be provided at the laser engine 52 to power the light sources and possibly the controller (thus making the laser light engine a mobile unit).

The cable 70 may also be configured with an audio line that provides audio signals in parallel with the video images. By way of example, the head mounted display apparatus 58 may include integrated earphones capable of transmitting audio signals to the user's ears. The audio line may be an electrical line or an optical line. In some cases, the optical line used to transmit the RGB laser light is also used to send audio signals (e.g., multifunctionality).

The imaging device 60 can be widely varied. In one embodiment, the imaging device 60 utilizes one or more chip based optical MEMs imaging elements. The optical MEMs imaging elements may for example include one or more tiltable micro mirrors or deformable mirrors capable of scanning a video image by reflecting the laser light generated from the laser engine. In one implementation, the optical MEMs imaging elements are configured to create raster scanned images. This is typically accomplished with horizontal and vertical mirrors that receive the laser light and build the video images one pixel at a time. For example, they may sequence between pixels and rows of pixels. In another implementation, the optical MEMs imaging elements are configured to create whole scan images. This is typically accomplished with an array of micro mirrors that can either tilt toward the light (on) or away from it (off). The number of mirrors generally corresponds to the resolution of the desired image.

In another embodiment, the imaging device 60 utilizes one or more chip based LCOS imaging elements. In LCOS, liquid crystals are applied to a reflective mirror substrate. As the liquid crystals open and close, the light directed thereon is either reflected from the mirror below, or blocked. The number of liquid crystals generally corresponds to the resolution of the desired image.

In yet another embodiment, rather than using liquid crystals to reflect and block light, the liquid crystals are used to transmit and block light similar to LCD displays.

Regarding the above embodiments, if a single imaging element is used, then red, green and blue images are displayed sequentially at a sufficiently high rate thereby creating a composite full color image. That is, the red, green and blue colors are flashed so fast that the eyes do not see the individual colors but rather integrates the sequential colors into a full color image. If multiple imaging elements are used, then each color is directed to its own element and thereafter the colors are optically combined thereby creating a composite full color image. In both implementations, the light is typically directed through a lens that delivers the light to the appropriate display element.

The display unit 62 may also be widely varied. In one embodiment, the display elements 64 and 66 are formed from substantially transparent materials (e.g., glass or plastic). The transparent display elements 64 and 66 are configured to be filled with video images when video is playing, and configured to allow normal viewing therethrough when video is not playing. In another embodiment, the display elements 64 and 66 may be embodied as wedge shaped waveguides which are substantially planar pieces of transparent glass or plastic with a portion tapered to form a wedge. The image travels internally by reflection until it reaches the tapered wedge section. The tapered wedge section changes the angle of incidence of the image progressively. At a certain point the angle of incidence is such that the image emerges from the optical element. In some cases, the video image enters the edge of the wedge optics, and travels through an expansion region before it is displayed to the user's eye. Its thickness can be as small as about 2 mm, and its size can vary according to the display needs of the head mounted display apparatus. It is also possible to use a folded design, which may save space compared to other optical arrangements. In fact, the folded design may cut the optical path in half.

By way of example and not by way of limitation, the folded wedge shaped wave guides may generally correspond to the folded wedge shaped waveguide technology of Cambridge FPD Limited of Fenstanton, Cambs, UK.

In accordance with one embodiment, the remote laser engine 52 is a portable unit that can be carried by the user. In some cases, it may even be a highly compact handheld unit. In fact, it may include a strap, clip or other attachment means for coupling to the user or an article of clothing thereby making it easily transportable. The user simply wears the head mounted display apparatus 58 that includes the imaging device 60 and displays elements 64 and 66 on their head, and attaches the laser engine 52 to their person thereby keeping their hands free to do other tasks. In the case where the display element(s) 64 and 66 are formed from transparent optical elements, the user can further be mobile when images aren't being displayed, i.e., the user can see through the display unit similar to traditional eye glasses. Furthermore, in cases where the laser engine 52 is powered by a battery rather than a power cable the user is free to move anywhere they like thereby making the laser engine 52 even more portable.

In one example of this embodiment, a user simply plugs their handheld video player such as the iPod manufactured by Apple Computer of Cupertino, Calif., into the compact laser engine attached to their belt, and places the headset on their head. The user then selects a video to be played at the handheld video player (viewing through transparent display elements). Once selected, the handheld video player generates a video signal which is processed into synchronized light control signals and image control signals for use by the laser engine and imaging device. In essence, the laser engine and imaging device work together to create dual video images in accordance with the video signal being outputted by the handheld video player. Furthermore, the display unit receives the dual video images from the imaging device and presents them for viewing. When video is not being played, no images are being created and thus the display unit act just like glasses. In fact, the head set may further include optical components that are based on the user' eyesight so they can see normally when the system is not operating. Thus, the user is able to select other video for playing without taking off the head gear. If the laser engine further includes a battery, the user can be very mobile while utilizing and wearing the system 50 (e.g., not limited to the length of a power cord).

Figure 4:
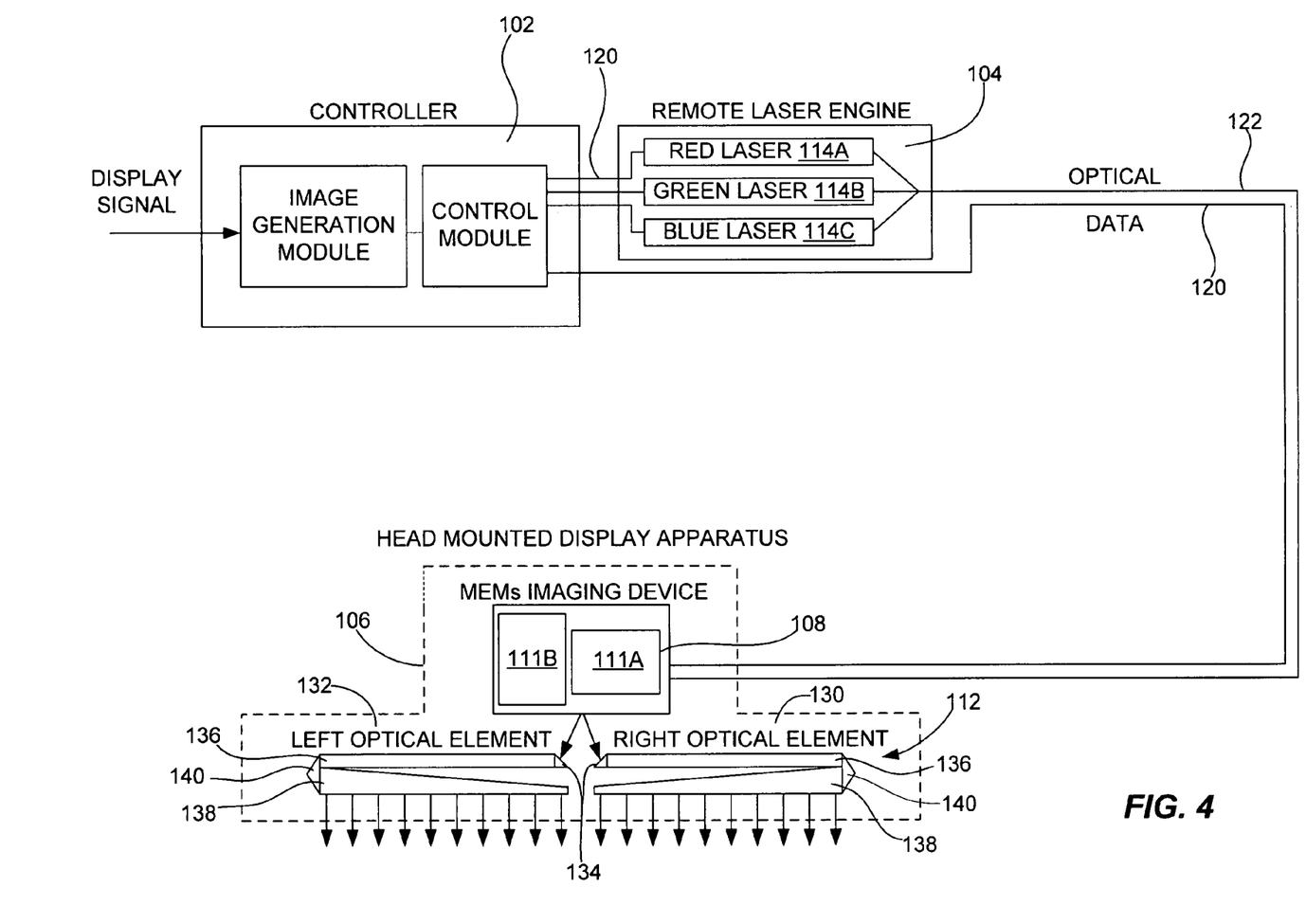
FIG. 4 is a block diagram of a laser based binocular near eye display system, in accordance with one embodiment of the present invention.

FIG. 4 is a block diagram of a laser based binocular near eye display system 100, in accordance with one embodiment of the present invention. The laser based binocular near eye display system 100 may for example correspond to the laser based binocular near eye display system shown and described in FIG. 3.

The laser based binocular near eye display system 100 includes a remote video controller 102, a remote laser light engine 104 and a head mounted display apparatus 106 having a MEMs based imaging device 108 that is in communication with but is physically separated from the remote video controller 102 and laser light engine 104. During operation, the MEMs imaging device 108 cooperates with the laser light engine 104 under direction from the video controller 102 to create left and right video images associated with a video signal. The left and right video images are transmitted to a display unit 112 capable of making the left and right video images viewable to a user.

The remote video controller 102 is configured to receive a display signal from a display source and divide the image frames of the display signal into left and right images. In one embodiment, this is accomplished by simply duplicating the images frames into two image frames. In other embodiments, additional operations can be performed when dividing the image frames as for example translating the images by some fraction in the horizontal plane such that the left and right images are slightly different. This may be done to create stereoscopic images. The remote video controller 102 is also configured to convert the right and left images into colored pixels and generate synchronized RGB and image control signals for creating each of the colored pixels. The RGB control signals are sent to the remote laser engine 104 and the image control signals are sent in parallel to the MEMs image device 108 located at the head mounted display apparatus 106. This is generally accomplished using separate data lines 120.

The remote laser engine 104 is configured to receive the laser control signals from the video controller 102 and control a red laser 114A, a green laser 114B and a blue laser 114C accordingly. In most cases, the laser sources 114 are controlled in a modulated fashion. That is, the red, green and blue laser light are sequentially or alternately outputted. The laser light is delivered to the MEMS based imaging device 108 via a single optical line 122 (e.g., fiber optic). The data line 120 and optical line 122 that connects with the MEMS based imaging device may be bundled into a single cable.

The MEMs based image device 108 is configured to receive the image control signals from the video controller 102 and the modulated RGB laser light from the laser light sources 114 and manipulate the modulated RGB laser light in accordance with the image control signals to form raster scan images. The MEMs based imaging device 108 utilizes micro mirrors 111 placed in series to create each colored pixel at a time. At least one micro mirror 111A controls the horizontal position, and at least a second micro mirror 111B controls the vertical position of each colored pixel. In essence, the movement of the micro electro mirrors 111 are coordinated with the modulated RGB laser light to build the left and right video images. This is a color sequential pixel based technique.

By way of example, in order to create a purple pixel, the laser sources 114A and 114C alternately flash red and blue light and the vertical and horizontal mirrors 111 reflect the red and blue light to the same pixel location. Generally speaking, all the pixels requiring red light are generated in a first color operation, all the pixels requiring green light are generated in a second color operation, all the pixels requiring blue light are generated in a third color operation. Once all the operations are complete, a full composite image is created (the eyes blend the rapidly alternating flashes of light).

In the illustrated embodiment, the MEMs imaging device 108 includes vertical and horizontal micro electro mirrors 111 that reflect light in cooperation with modulated RGB laser light to create raster scanned video images. At present, the horizontal scanning rate is about 31 kHz and the vertical scanning rate is in the range of about 0-400 Hz. Of course, these parameter will change as new types of MEM elements and lasers become available. One advantage of a MEMs laser system is they have an infinite focal distance. This means that one can create an image on a flat surface at any distance and that image will be in focus.

Alternatively, it is also possible to use a single micro mirror that moves in two axes to make raster scanned images. In this embodiment, the single micro mirror rotates horizontally to scan across and then incrementally rotate vertically to draw a new line. The single micro mirror device may for example be one of those produced by Microvision Inc. of Redmond, Wash.

Referring now to the display unit 112, the display unit 112 includes a right optical element 130 and a left optical element 132 that are positioned in a side by side relationship. The right optical element 130 receives right video images projected from the MEMs based imaging device 108, and the left optical element 132 receives left video images projected from the MEMs based imaging device 108. Each of the optical elements 130 and 132 is configured to transforms the video images into images capable of being viewed. They may for example optically transmit the video images to an optical imaging surface that is perpendicular to the viewer's eyes. They may also optically adjust the video images depending on the desired configuration (e.g., expand, bend, etc.).

Figure 5:
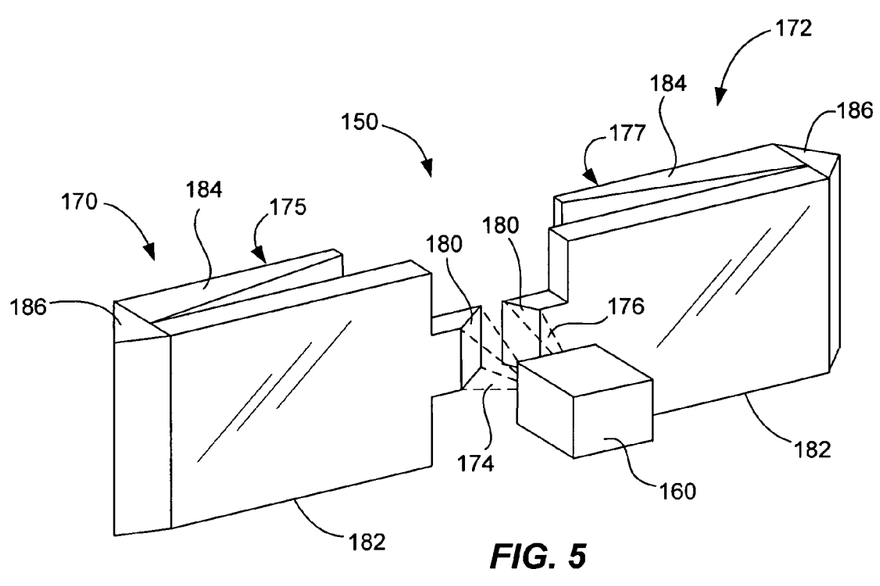
FIG. 5 is a diagram of a head mounted display apparatus, in accordance with one embodiment of the present invention.
Figure 6:
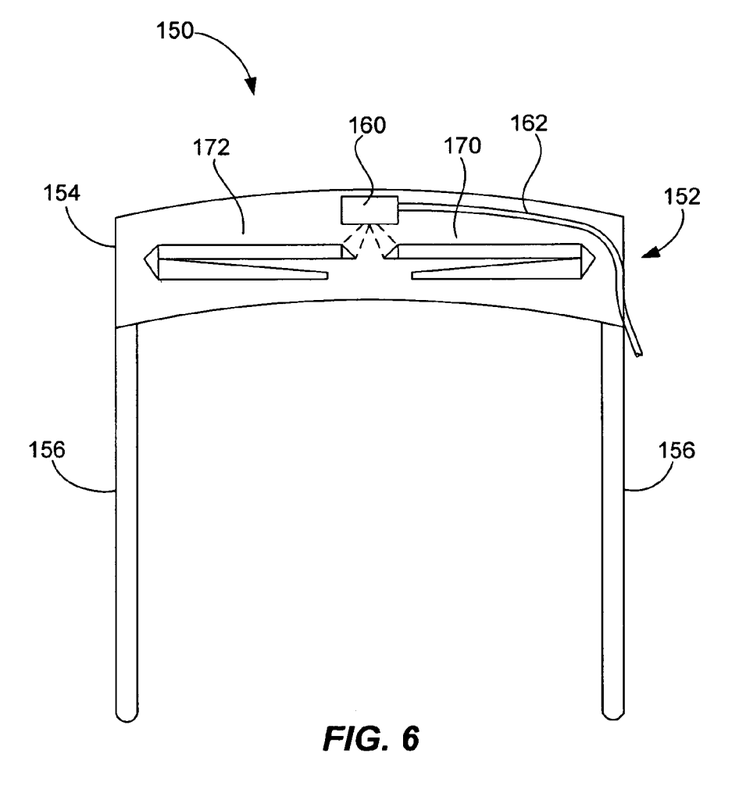
FIG. 6 is a diagram of a head mounted display apparatus, in accordance with one embodiment of the present invention.

In the illustrated embodiment, each of the optical elements 130 and 132 is set up similar to the arrangement shown in FIGS. 5 and 6. As shown, each of the optical elements 130 and 132 includes a light receiving area 134 onto which the video images are projected, an expansion portion 136 that expands the projected image to the desired size for viewing, and a display portion 138 that displays the expanded image to the viewer. The optical elements 130 and 132 further include optical components 140 disposed between the expansion portion 136 and display portion 138 for bending the transmitted images so that the display portion can be positioned in front of the expansion portion (e.g., stacked or folded) thereby decreasing its overall length.

When two optical elements 130 and 132 are used (e.g., the dual video images are two separate video images), the video entry points 134 are typically spatially separated from one another to prevent cross talk. By way of example, the entry points may be spaced apart at the center of the head mounted display apparatus at a location between the eyes. This layout is beneficial when using one imaging device as the imaging device can be centrally located proximate both entry points (e.g., the field of view of the imaging device extends over both entry points). Alternatively, the entry points may be positioned on the bottom or top or possibly on the outer sides. These layouts typically include multiple imaging devices (e.g., one for each entry point) or optical components that can carry the video images from an imaging device to a desired location See for example FIGS. 7A-7D).

FIGS. 5 and 6 are diagrams of a head mounted display apparatus 150, in accordance with one embodiment of the present invention. The head mounted display apparatus 150 may for example correspond to any of those described herein.

The head mounted display apparatus 150 includes a frame 152 wearable on a user's head. The frame 152 includes a viewing portion 154 that is positioned in front of the user's eyes when the frame 152 is worn on their head. By way of example, the viewing portion 154 may rest on the nose of the user. The frame 152 may also include bands 156 that wrap around the sides of the user's head. The bands 156 may for example pinch the head and/or rest on the user's ears.

The head mounted display apparatus 150 also includes one or more imaging devices 160 that are carried by the frame 152. The imaging devices may be mounted in variety of locations. However, in most cases, the imaging devices are mounted in the center portion of the viewing area 154 (e.g., portion between the eyes). The imaging devices 160 are configured to create two video images from laser light in conjunction with a video signal. In one embodiment, a single imaging device is used to create the dual video images. In another embodiment, multiple imaging devices are used to create the dual video images.

The imaging device(s) 160 may for example be a MEMs based image device that uses micro mirrors to create dual laser images from modulated RGB laser light received from a laser engine. The laser light may for example be transmitted through a fiber optic cable 162 that has one end connected to a remote laser engine and the other end connected to the head mounted display apparatus 150. By way of example, a portion of the fiber optical cable 162 may be attached or integrated with the frame 152 with its end connecting to the imaging device 160 using conventional optical connectors and components. In one example, the fiber optic cable 162 may run along one of the bands 156 of the frame 152 and then around the bottom or top of viewing area 154 of the frame 152 until it reaches the imaging device(s) 160, which is typically located in the center of the viewing area 154 (between the eyes).

The head mounted display apparatus 150 also includes a left optical display element 170 and a right optical display element 172 that are carried by the viewing portion 154 of the frame 152. The left optical display element 170 is positioned in a left portion of the viewing area 154, and the right optical display element 172 is positioned in a right portion of the viewing area 154. The left optical display element 170 is configured to receive a first video image 174 of the dual video images from the image device(s) and display them on a left imaging surface 175 thereby creating left display images. The right optical display element 172 is configured to receive a second video image 176 of the dual video images from the image device(s) and display them on a right imaging surface 177 thereby creating right display images.

As shown, each of the optical display elements 170 and 172 include an entry point 180 onto which the respective video images are projected. In most cases, the image is injected into the entry point at approximately 45 degrees. Although the entry point can be at a variety of locations, in the illustrated embodiment, the entry points 180 are placed towards the center of the head mounted display apparatus 150 within the imaging field of the imaging device(s) 160. Furthermore, to prevent cross talk (contamination of left and right images), the entry points 180 are typically spaced apart. The amount they can be spaced apart is typically dependent on the imaging field of the imaging device(s) 160 and the desire level of cross talk.

In one embodiment, each of the optical elements 170 and 172 are miniature transparent folded wedge optics sized and dimensioned for head mounted display apparatus 150. These type of optics produce a very large image in limited space. Furthermore, they are very thin and compact and therefore a compact and low profile head mounted display apparatus can be created. As shown, each of the optical elements 170 and 172 include a planar expansion portion 182 and a wedge portion 184 that is placed in front of the planar expansion portion 182 in a stacked substantially parallel relationship. The backside of the wedge optics 184 include a taper while the front side (side closest to the eye) is substantially flat and positioned so that it is substantially perpendicular to the optical path of the eye. Furthermore, the planar expansion portion 182 and wedge portions 184 are formed from substantially transparent materials. Moreover, each of the optical elements 170 and 172 includes an optical component 186 optically coupling the planar portion 182 with the wedge portion 184. The optical component 186 is designed to bend the expanded laser image around to the wedge portion (turns it around).

During operation, the video image is transmitted into the entry point 180 (light receiving area). Thereafter, the video image is allowed to expand in the expansion portion 182 (the size of the laser image is allowed to grow to its desired size for viewing). This is typically accomplished with total internal reflection (The image travels internally by reflection through the planar portion). Generally, when the right image size is obtained that's when the wedge portion is started. Thereafter, the expanded laser image proceeds through the optical component 186, which turns it back around so that it can be injected into the wedge portion 184. When the laser image enters the wedge portion 184, the light that intersects the tapered portion is redirected out of the wedge portion 184 substantially perpendicular to the flat portion thereby creating an image that is viewable to the user. The tapered portion changes the angle of incidence of the image progressively so that it can be viewed by the eye.

The folded wedge optics can be formed from a single integral piece or they may be formed from wedge portions can be separate pieces that are glued together.

By way of example and not by way of limitation, the folded wedge optics may generally correspond to the wedge shaped waveguide technology of Cambridge FPD Limited of Fenstanton, Cambs, UK.

Figure 7A:
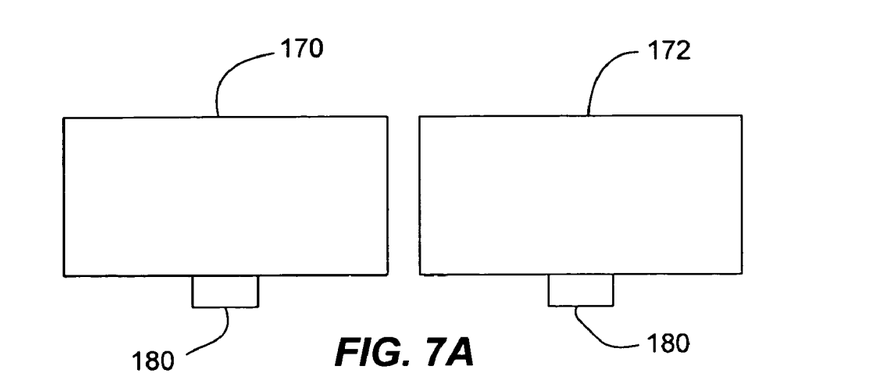
FIGS. 7A-7D are diagrams of various display arrangement, in accordance with alternate embodiments of the present invention.
Figure 7B:
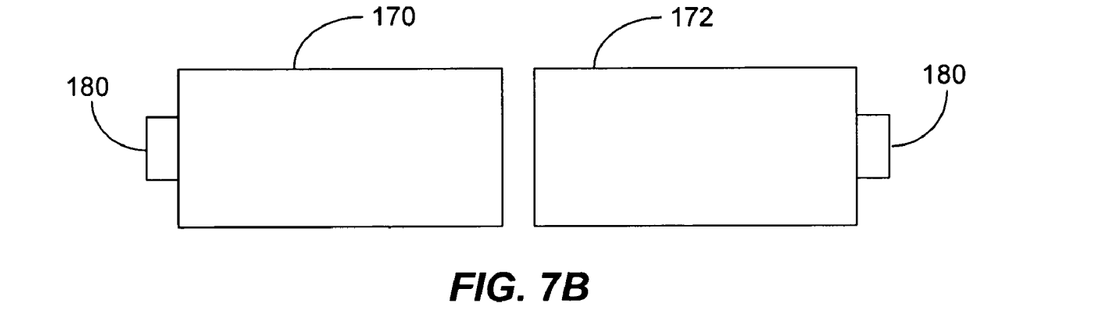
Figure 7C:
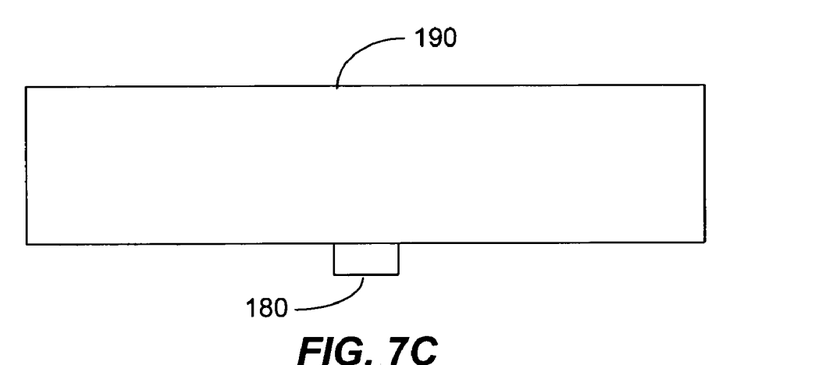
Figure 7D:
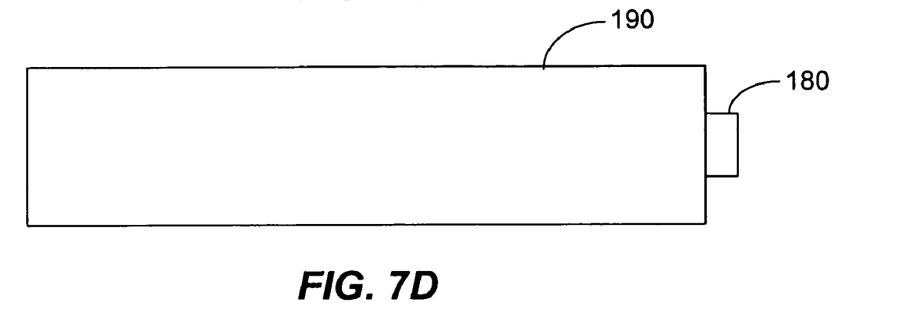

FIGS. 7A-7D show alternate embodiments of the present invention. In FIG. 7A, the optical entry point 180 of the optical display elements 170 and 172 are disposed at the bottom or top of the viewing area 154. This may place the entry points too far apart for a single imaging device and thus multiple imaging devices may be required. Alternatively, special optics may be used to route video images from a single imaging device to the spaced apart entry points. In FIG. 7B, the optical entry points 180 are located at the outside edges of the viewing area 154. Similar to the embodiment of FIG. 7A, the optical entry points 180 may be too far apart and thus multiple imaging devices may be required (or alternatively special optics for routing video images). In FIGS. 7C and 7D, a single optical display element 190 is used to generate dual video images (e.g., a single video image is divided into left and right portions). Like FIG. 7A, the optical display element 190 shown in FIG. 7C includes an optical entry point 180 at the top or bottom. Like FIG. 7B, the optical display element 190 shown in FIG. 7D includes an optical entry point 180 at the side (left or right).

Figure 8:
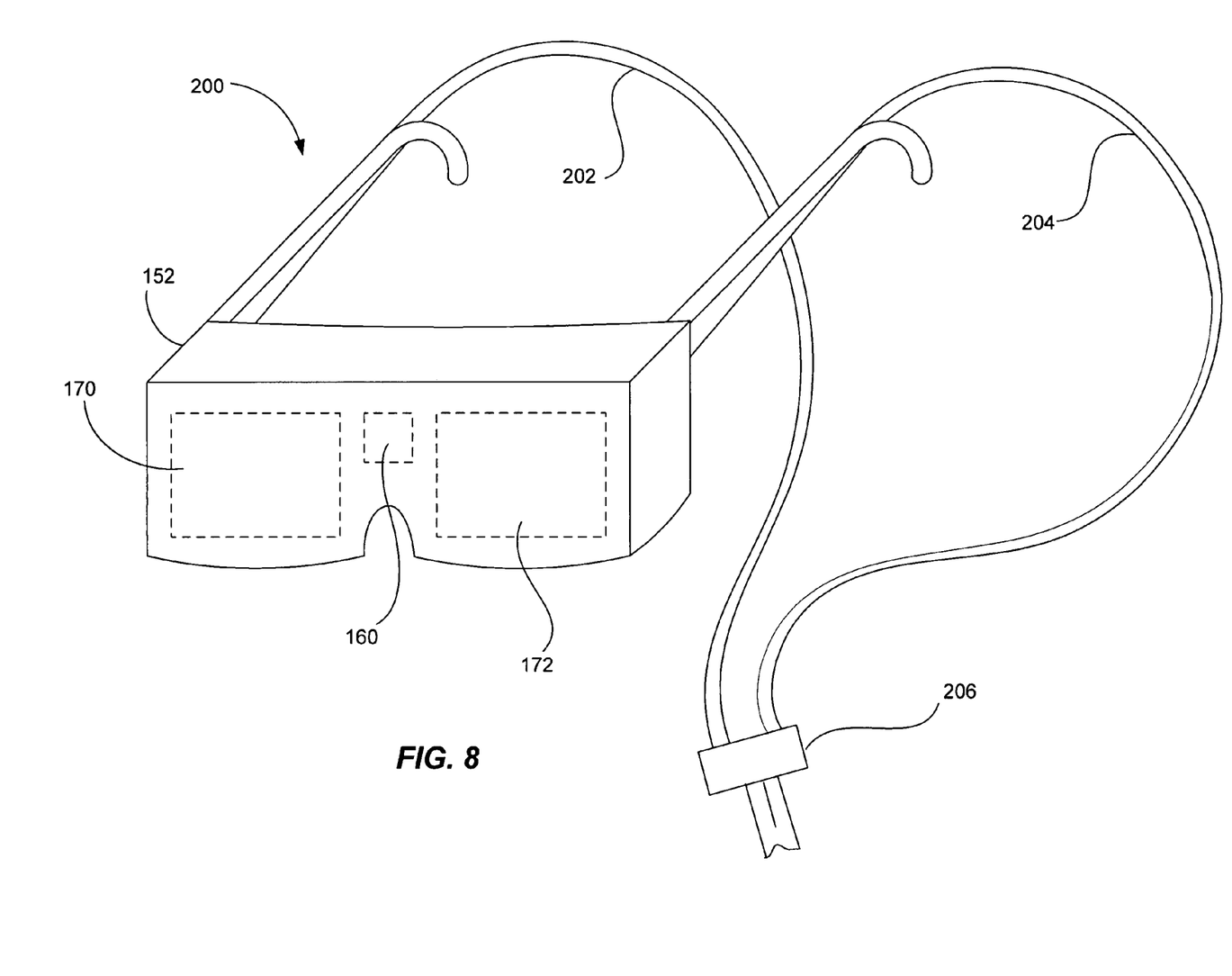
FIG. 8 is a diagram of a head mounted display apparatus, in accordance with one embodiment of the present invention.

FIG. 8 is a diagram of a head mounted display apparatus 200 with integrated fiber optic line 202 and electrical lines 204, in accordance with one embodiment of the present invention. The fiber optic line 202 is integrated at a first side of the frame 152 and the electrical lines 202 are integrated with a second side of the frame 152. The optical lines 202 are configured to transmit light from a remote light arrangement to the head mounted display apparatus 200. The electrical lines 202 may for example include data lines for video control signals and audio data and/or power lines for powering the imaging device and other devices of the head mounted display apparatus 200. In one embodiment, the optical line 202 and electrical line 204 are formed as a lanyard. In this embodiment, the head mounted display apparatus 200 may further include an adjustable clip 206 for adjusting a loop size. As such, the head mounted display apparatus 200 can be better secured to the user's head, and further be removed while still being retained around the user's neck. One example of a lanyard that can be used herein with little or some modification may be found in U.S. patent application Ser. No. 11/212,514 entitled LANYARD FOR HANDHELD ELECTRONIC DEVICE, filed on Aug. 24, 2005, which is herein incorporated by reference.

Figure 9:
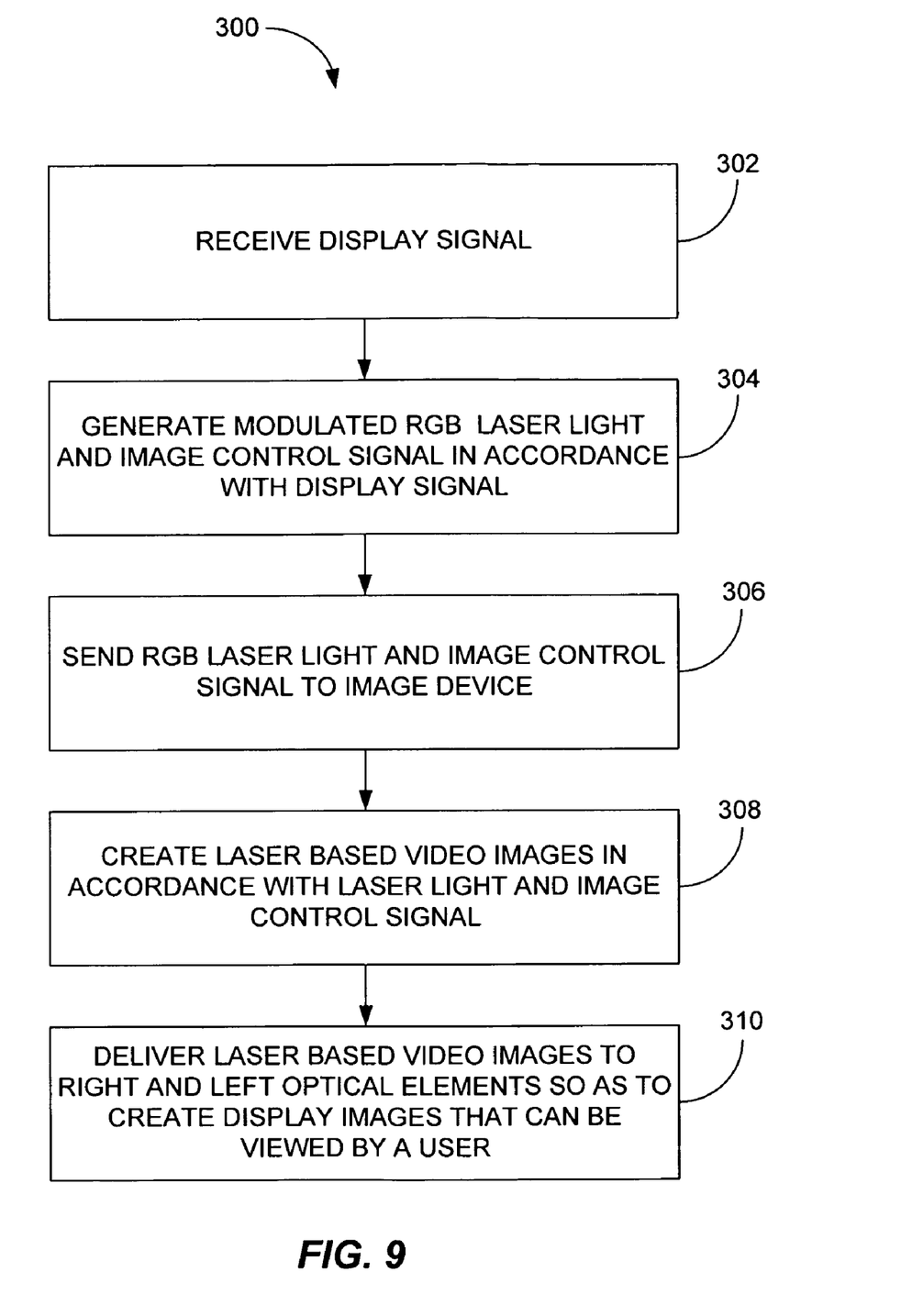
FIG. 9 is a method of producing dual images for a binocular near eye display system, in accordance with one embodiment of the present invention.

FIG. 9 is a method 300 of producing dual images for a binocular near eye display system, in accordance with one embodiment of the present invention. The method 300 starts at block 302 where a display signal is received. The video signal may for example be outputted by a video source such as a video player.

Thereafter, the method 300 proceeds to block 304 where modulated RGB laser light and image control signal associated with the modulated RGB light is generated in accordance with the video signal. This may for example be accomplished with a video controller that contains instructions on how to generate modulated laser light and image control signals from video signals. In one embodiment, the modulated RGB laser light is generated remotely away from a head mounted display apparatus. The image control signals may additionally be generated remotely away from the head mounted display apparatus.

Following block 304, the method 300 proceeds to block 306 where the modulated RGB laser light and image control signal associated therewith is delivered to a head mounted display apparatus. In one embodiment, the head mounted display apparatus is physically separated from where the modulated RGB laser light and image control signals are being produced. In this embodiment, the modulated RGB laser light is transmitted to the head mounted display apparatus via an optical line such as an optical fiber cable. The image control signals may be transmitted over a separate electrical line or possibly over the same optical line as the modulated RGB laser light.

Thereafter, in block 308 laser based video images are created in accordance with the modulated laser light and image control signal. This is typically performed at the head mounted display apparatus by one or more imaging devices that convert the optical data and control data into video images associated with the video signal. The imaging devices may for example be MEMS based imaging devices including those with vertical/horizontal positioning mirrors or those with an array of mirrors that turn off and on. The vertical/horizontal positioning mirrors typically create raster scan images. In a raster scan (using modulated RGB light), the image is created pixel by pixel (pixel sequential), and color by color (color sequential). The array of mirrors typically create whole images. In whole scan (using modulated RGB light), the image is created color by color for all pixels. In both cases, the modulated RGB light flashes so quickly that a person only sees a full composite image.

The laser based video images may be widely varied. In one embodiment, the video images are embodied as a single laser based video image containing left and right portions. In another embodiment, two distinct laser based video images are created (a left video image and a right video image).

Following block 308, the method proceeds to block 310 where the laser based video images are delivered to a display unit so that the laser based video images can be seen by a viewer wearing the head mounted display apparatus. By way of example, the laser based images may be projected onto or injected into one or more display elements. In one embodiment, a laser based video image containing left and right portions is delivered to a single display element of the display unit. The left portion of the video image is displayed at a left portion of the display element, and the right portion of the video image is displayed at a right portion of the optical member. In another embodiment, a right laser based video image is delivered to a right display element, and a left laser based image is delivered to a left display element. The right and left display elements are separate and distinct components. The right display element displays the right video image, and the left display element displays the left video image.

In one embodiment, the display elements are transparent optical components that each include a light receiving area, an expansion portion and a display portion. The light receiving area receives laser video images that have been focused thereon from a laser based imaging system and passes them to the expansion portion. The expansion portion receives the laser video images from the light receiving area and provides a means for expanding the laser video image to the appropriate image size for viewing (e.g., magnifies the image). The display portion receives the expanded laser video image from the expanded portion and outputs an image for display at an imaging surface. In one implementation, the display portion is folded back over the expansion portion and therefore the laser video images are redirected in the opposite direction via an optical component disposed between. By way of example the laser video image may be bent optically.

In one embodiment, the expansion portion is embodied as a slab waveguide with parallel surfaces and the display portion is embodied as wedge shaped waveguide that has at least one surface that tapers from bottom to top. When light rays associated with the laser video image are injected through the edge of the expansion portion at a suitable angle, the light rays associated with the laser video image tend to propagate at the same angle through the expansion portion by total internal reflection. Furthermore, the light rays associated with the laser video image tend to spread out as they propagate through the expansion portion. In most cases, the expansion portion ends when the expanded light rays associated with the laser video image reach the width of the wedge shaped display portion (the desired size of the display). When the light rays associated with the laser video image are injected into the wider end of the wedge shaped display portion, the angle of the light rays associated with the laser video image relative to the normal of the display portion changes slightly each time the light rays are reflected between opposing surfaces. After many reflections, the angle of the light rays associated with the laser video image eventually reaches a critical angle at which total internal reflections no longer occur. At this point, the light rays associated with the laser video image emerge from the display portion thereby creating a displayable laser image that emanates from the display portion.

Various enhancements may be applied to the present invention to further improve the HDMs. For example, the invention may provide methods and apparatus for providing a wider field of view and creating a more natural viewing situation for a user of a head mounted display, which results in improved comfort and usability for head mounted displays as described in co-pending U.S. patent application Ser. No. 11/580,580, entitled ENHANCED IMAGE-DISPLAY IN HEAD-MOUNTED DISPLAYS, filed on Oct. 16, 2006, which is herein incorporated by reference.

The invention may also provide methods and apparatus for treating the peripheral area of a user's field of view in a head mounted display, and thereby creating improved comfort and usability for head mounted displays as described in co-pending U.S. patent application Ser. No. 11/580,774, entitled PERIPHERAL TREATMENT FOR HEAD-MOUNTED DISPLAYS, filed on Oct. 13, 2006, which is herein incorporated by reference.

The invention is preferably implemented by hardware, software or a combination of hardware and software. The software can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

While this invention has been described in terms of several preferred embodiments, there are alterations, permutations, and equivalents, which fall within the scope of this invention. For example, although wedge shaped optics are primarily discussed herein, it should be appreciated that conventional optics may be used for the display elements. Furthermore, although the image device is discussed primarily as being proximate the display elements, it should be appreciated that this is not a limitation and that they may be placed away from the display elements. In cases such as these an optical component would be disposed between the image device and the display element so that the video images could be routed to the display element. Typically however, it is generally believed that closer image device is to the display elements, the better the system (more compact, better image, etc.). It should also be noted that there are many alternative ways of implementing the methods and apparatuses of the present invention. For example, although the invention is primarily directed at binocular display systems, it should be appreciated that the invention may also be utilized in a monocular display system. It is therefore intended that the following appended claims be interpreted as including all such alterations, permutations, and equivalents as fall within the true spirit and scope of the present invention.

What is claimed is:

1. A head mounted display (HMD) apparatus, comprising:
a frame wearable on a user's head, and including a viewing area;
an imaging device positioned substantially in the center of the viewing area, the imaging devices being carried by the frame and configured to create dual images from light received from a light arrangement in conjunction with a display signal;
a left folded wedge display carried by the frame and positioned at the left of the viewing area, the left folded wedge display having a left expansion portion, a left display portion, and a left light receiving portion disposed at an angle from the left expansion portion, wherein the left light receiving portion is configured to receive left image of the dual images from the imaging device and to redirect the left image to the left expansion portion; and
a right folded wedge display carried by the frame and positioned at the right of the viewing area, the right folded wedge display having a right expansion portion, a right display portion, and a right light receiving portion disposed at an angle from the right expansion portion, wherein the right light receiving portion is configured to receive a right image of the dual images from the imaging device and to redirect the right image to the right expansion portion.

2. The HMD apparatus of claim 1, wherein the left and right light receiving portions are provided to decrease an angle of projection between the dual images created by the imaging device.

3. The HMD apparatus of claim 1, wherein the imaging device is physically decoupled from, and in optical communication with a light arrangement.

4. The HMD apparatus of claim 3, wherein the imaging device comprises a MEMs based imaging device comprising a plurality of micro mirrors, and the dual images comprise dual laser images created from modulated RGB laser light received from the light arrangement.

5. The HMD apparatus of claim 1, wherein the imaging device is positioned such that when the HMD apparatus is worn by a person, the imaging device is in front of and between the eyes of the person.

6. The HMD apparatus of claim 1, wherein the left folded wedge display further comprises a left optical bend component disposed between the left expansion portion and the left display portion, wherein the left optical bend component bends the image as expanded by the left expansion portion around to the left display portion.

7. The HMD apparatus of claim 6, wherein the left folded wedge display does not include a collimating lens, and the left optical bend component bends light from the left expansion portion around to the left display portion.

8. The HMD apparatus of claim 1, wherein the right folded wedge display does not include a collimating lens, and the right folded wedge display further comprises a right optical bend component disposed between the right expansion portion and the right display portion, wherein the right optical bend component bends light from the right expansion portion around to the right display portion.

9. The HMD apparatus as recited in claim 1, wherein left light receiving portion is disposed at an approximately 45 degree angle from the left expansion portion.

10. The HMD apparatus of claim 1, wherein the left folded wedge display is oriented in the frame such that the left light receiving portion is towards the center of the viewing area.

11. The HMD apparatus of claim 10, wherein the left folded wedge display is oriented in the frame such that the left folded wedge display is folded around a vertical axis, and the left image propagates through the left folded wedge display substantially horizontally with respect a head or a person wearing the HMD apparatus.

12. The HMD apparatus of claim 11, wherein the right folded wedge display is oriented in the frame such that the right light receiving portion is towards the center of the viewing area.

13. The HMD apparatus of claim 12, wherein the left folded wedge display is oriented in the frame such that the left folded wedge display is folded around a vertical axis, and the left image propagates through the left folded wedge display substantially horizontally with respect a head or a person wearing the HMD apparatus.

14. The HMD apparatus of claim 10, wherein the right folded wedge display is oriented in the frame such that the right folded wedge display is folded around a vertical axis and the right image propagates through the right folded wedge display substantially horizontally with respect a head or a person wearing the HMD apparatus.

15. The HMD apparatus of claim 1, wherein the left and right wedge displays are formed from one integral piece.

16. A method of producing displayable images for a binocular near eye display system, said method comprising:
generating RGB laser light in accordance with a display signal;
creating laser images with the laser light; and
displaying the laser images at a head mounted display apparatus by passing the RGB laser light into a left light receiving portion of a left folded wedge display carried by a frame and positioned at the left of a viewing area, the left folded wedge display further having a left expansion portion, and a left display portion, wherein the left light receiving portion is disposed at an angle from the left expansion portion, and wherein the left light receiving portion is configured to redirect the RGB laser light to the left expansion portion.

17. The method of claim 16, further comprising:
displaying the laser images at a head mounted display apparatus by passing the RGB laser light into a right light receiving portion of a right folded wedge display carried by the frame and positioned at the right of a viewing area, the right folded wedge display further having a right expansion portion, and a right display portion, wherein the right light receiving portion is disposed at an angle from the right expansion portion, and wherein the right light receiving portion is configured to redirect the RGB laser light to the right expansion portion.

18. The method of claim 16, wherein the passing the RGB laser light includes using vertical and horizontal micro electro mirrors placed in series to deliver color images to the left folded wedge display by, for each pixel to be displayed, flashing a red component of an image in a first color operation, then, for each pixel to be displayed, flashing a green component of the image in a second color operation, then, for each pixel to be displayed, flashing a blue component of the image in a third color operation.

19. The method as recited in claim 16, wherein displaying the laser images includes receiving the laser images; expanding the laser images through an optical element, displaying the expanded laser images through the optical element.

20. The method as recited in claim 16, wherein the generating RGB laser light in accordance with a display signal is performed at a location separate from the head mounted display apparatus.

21. The method as recited in claim 20, wherein creating laser images is performed at the head mounted display apparatus.

22. A head mounted display (HMD) apparatus, comprising:
a frame wearable on a user's head, and including a viewing area;
an imaging device positioned substantially in the center of the viewing area, the imaging devices being carried by the frame and configured to create dual images from light received from a light arrangement in conjunction with a display signal;
a non-collimating left folded wedge display carried by the frame and positioned at the left of the viewing area, the left folded wedge display having a left expansion portion, a left display portion, and a left optical bend component disposed between the left expansion portion and the left display portion, wherein the left optical bend component bends light from the left expansion portion around to the left display portion; and a non-collimating right folded wedge display carried by the frame and positioned at the right of the viewing area, the right folded wedge display having a right expansion portion, a right display portion, and a right optical bend component disposed between the right expansion portion and the right display portion, wherein the right optical bend component bends light from the right expansion portion around to the right display portion.

23. The HMD apparatus of claim 22, wherein the left folded wedge display is configured to receive a left image of the dual images at the left expansion portion and to display the left image at the left display portion.

24. The HMD apparatus of claim 23, wherein the left image is provided to the left folded wedge display directly from the imaging device without being focused by a lens.

25. The HMD apparatus of claim 22, wherein the imaging device is physically decoupled from, and in optical communication with a light arrangement.

26. The HMD apparatus of claim 25, wherein the imaging device comprises a MEMs based imaging device comprising a plurality of micro mirrors, and the dual images comprise dual laser images created from modulated RGB laser light received from the light arrangement.

27. The HMD apparatus of claim 22, wherein the imaging device is positioned such that when the HMD apparatus is worn by a person, the imaging device is in front of and between the eyes of the person.

28. The HMD apparatus of claim 22, wherein the left folded wedge display is oriented in the frame such that the left light receiving portion is towards the center of the viewing area.

* * * * *